United States Patent
Niitsuma et al.

(10) Patent No.: US 10,477,851 B2
(45) Date of Patent: Nov. 19, 2019

(54) DUAL-BEARING REEL

(71) Applicant: Shimano Inc., Sakai, Osaka (JP)

(72) Inventors: Akira Niitsuma, Osaka (JP); Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/800,970

(22) Filed: Nov. 1, 2017

(65) Prior Publication Data

US 2018/0199558 A1 Jul. 19, 2018

(30) Foreign Application Priority Data

Jan. 19, 2017 (JP) ................................ 2017-007308

(51) Int. Cl.
| | | |
|---|---|---|
| *A01K 89/01* | (2006.01) | |
| *A01K 89/033* | (2006.01) | |
| *A01K 89/015* | (2006.01) | |

(52) U.S. Cl.
CPC ............ *A01K 89/05* (2015.05); *A01K 89/015* (2013.01)

(58) Field of Classification Search
CPC ............ A01K 89/0186; A01K 89/0192; A01K 89/053; A01K 89/0183
See application file for complete search history.

(56) References Cited

U.S. PATENT DOCUMENTS

| | | | | | |
|---|---|---|---|---|---|
| 4,966,335 | A | * | 10/1990 | Kaneko .............. | A01K 89/0184 242/255 |
| 5,372,323 | A | * | 12/1994 | Hirano .................. | A01K 89/029 242/299 |
| 2006/0006267 | A1 | * | 1/2006 | Hirayama .......... | A01K 89/0192 242/223 |
| 2011/0315801 | A1 | * | 12/2011 | Hayashi ............. | A01K 89/0117 242/247 |
| 2013/0153700 | A1 | * | 6/2013 | Niitsuma ............. | A01K 89/015 242/310 |
| 2015/0115087 | A1 | * | 4/2015 | Ohara ................. | F16C 32/0406 242/223 |

FOREIGN PATENT DOCUMENTS

| | | |
|---|---|---|
| JP | 2005-210998 A | 8/2005 |
| JP | 2013-143927 A | 7/2013 |

* cited by examiner

*Primary Examiner* — Emmanuel M Marcelo
(74) *Attorney, Agent, or Firm* — Global IP Counselors, LLP

(57) ABSTRACT

A dual-bearing reel includes a reel body, a drive shaft, a roller clutch, and a prevention member. The reel body includes a boss portion. The drive shaft extends through the boss portion and is rotatably supported in the reel body. The roller clutch includes an outer race non-rotatably mounted in the boss portion, an inner race connected to the drive shaft so as to be integrally rotatable, and a rolling element disposed between the outer race and the inner race. The roller clutch prevents rotation of the drive shaft in one direction. The prevention member is mounted on the outer perimeter of the boss portion to prevent radially outward expansion of the boss portion.

5 Claims, 4 Drawing Sheets

DUAL-BEARING REEL

CROSS-REFERENCE TO RELATED APPLICATIONS

This application claims priority to Japanese Patent Application No. 2017-007308, filed on Jan. 19, 2017. The entire disclosure of Japanese Patent Application No. 2017-007308 is hereby incorporated herein by reference.

BACKGROUND

Field of the Invention

The present invention relates to a dual-bearing reel.

Background Art

In general, a dual-bearing reel includes a one-way clutch for preventing the rotation of the handle in one direction. For example, in Japanese Laid-Open Patent Application No. 2013-143927, a small, lightweight, roller-type, one-way clutch (hereinafter referred to as roller clutch) is mounted on a handle shaft. A roller clutch comprises an outer race that is non-rotatably mounted in the reel body, an inner race that is connected to the handle shaft so to be integrally rotatable, and a rolling element that is disposed between the outer race and the inner race.

In such a small, lightweight roller clutch, the rigidity of the outer race is generally low. Therefore, when preventing the rotation of the handle in one direction, slippage between the outer race and the rolling element is suppressed by utilizing the rigidity of the reel body in which the outer race is non-rotatably mounted.

When such a roller clutch with a low-rigidity outer race is employed in a synthetic resin reel body, for example, slippage between the outer race and the rolling element cannot be suppressed by utilizing the rigidity of the reel body, and there are cases in which the handle will rotate idly with respect to the reel body under high load. More specifically, when the rolling element bites in between the cam surface of the outer race and the outer perimeter surface of the inner race, the outer race expands radially outwardly due to the low rigidity of the outer race. Then, if the rigidity of the reel body is low, this radially outward expansion of the outer race cannot be suppressed, and the reel body will also expand radially outwardly together with the increase in the diameter of the outer race. As a result, slippage occurs between the outer race and the rolling element, and the handle rotates idly relative to the reel body due to this slippage.

For the reasons described above, in a dual-bearing reel having, for example, a synthetic resin reel body with low rigidity, a small, lightweight roller clutch with a low-rigidity outer race can only be employed in certain small reels and the like, which is extremely restrictive.

SUMMARY

An object of the present invention is to allow the use of a small, lightweight roller clutch in a dual-bearing reel, regardless of the size and rigidity of the reel body, even when the rigidity of the reel body is low.

The dual-bearing reel according to one aspect of the present invention comprises a reel body, a shaft member, a roller clutch, and a prevention member. The reel body comprises a boss portion. The shaft member extends through the boss portion and is rotatably supported in the reel body. The roller clutch comprises an outer race that is non-rotatably mounted in the boss portion; an inner race that is connected to the shaft member so as to be integrally rotatable; and a rolling element that is disposed between the outer race and the inner race; and that prevents rotation of the shaft member in one direction. The prevention member is mounted on the outer perimeter of the boss portion to prevent a radially outward expansion of the boss portion.

In this dual-bearing reel, even when a roller clutch having a low-rigidity outer race is employed in a low-rigidity reel body, for example, it is possible to prevent the boss portion from expanding radially outwardly with the prevention member. As a result, it is also possible to prevent a radially outward expansion of the outer race that is non-rotatably mounted in the boss portion. Accordingly, when the rotation of the shaft member is prevented in one direction, the shaft member will not rotate idly with respect to the reel body, and rotation of the handle in one direction can be reliably prevented.

Preferably, the prevention member is disposed on the radially outer side of the roller clutch. In this embodiment, radially outward expansion of the roller clutch, which is disposed in the boss portion, can be prevented by the boss portion.

Preferably, the prevention member is annular. In this embodiment, it is simple to attach the prevention member relative to the boss portion, so that it is possible to prevent radially outward expansion of the boss portion over the entire circumference of the boss portion.

Preferably, the prevention member is made of a metal or resin.

According to the present invention, it is possible to employ a small, lightweight roller clutch, having an outer race with low rigidity, in a dual-bearing reel, regardless of size or the like of the reel body, even when the rigidity of the reel body is low.

DETAILED DESCRIPTION OF THE EMBODIMENTS

Figure 1:
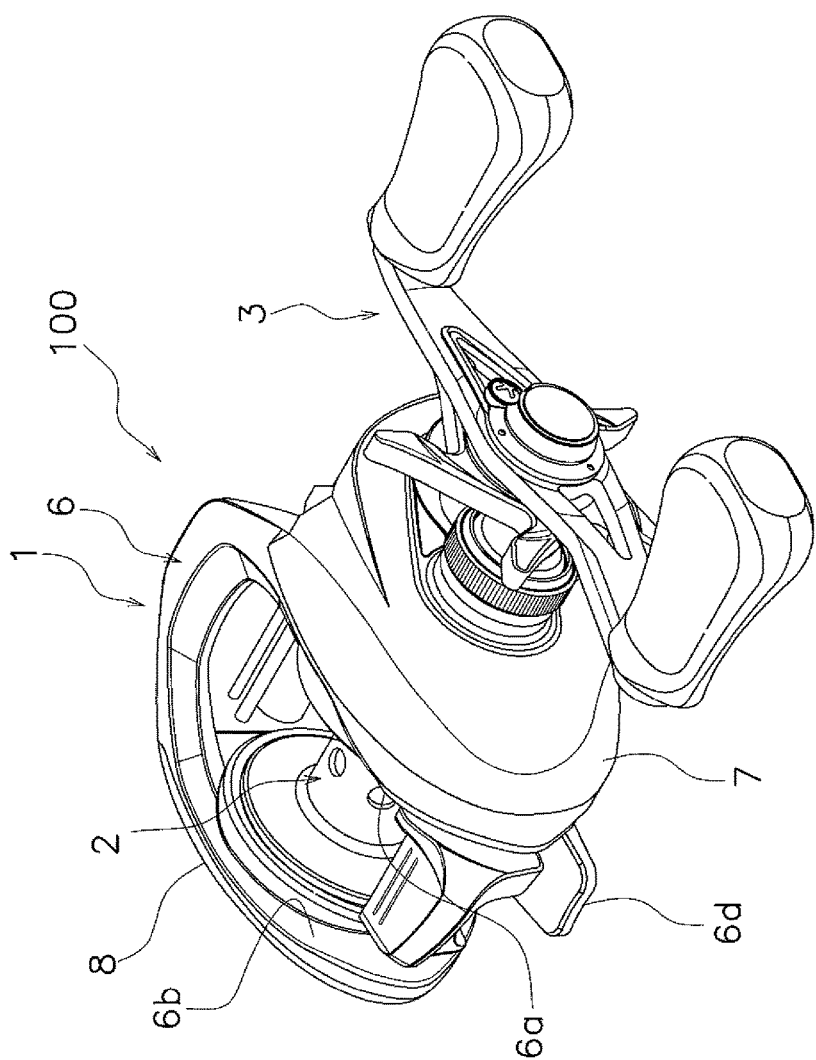
FIG. 1 is a perspective view of a dual-bearing reel according to one embodiment of the present invention.
Figure 2:
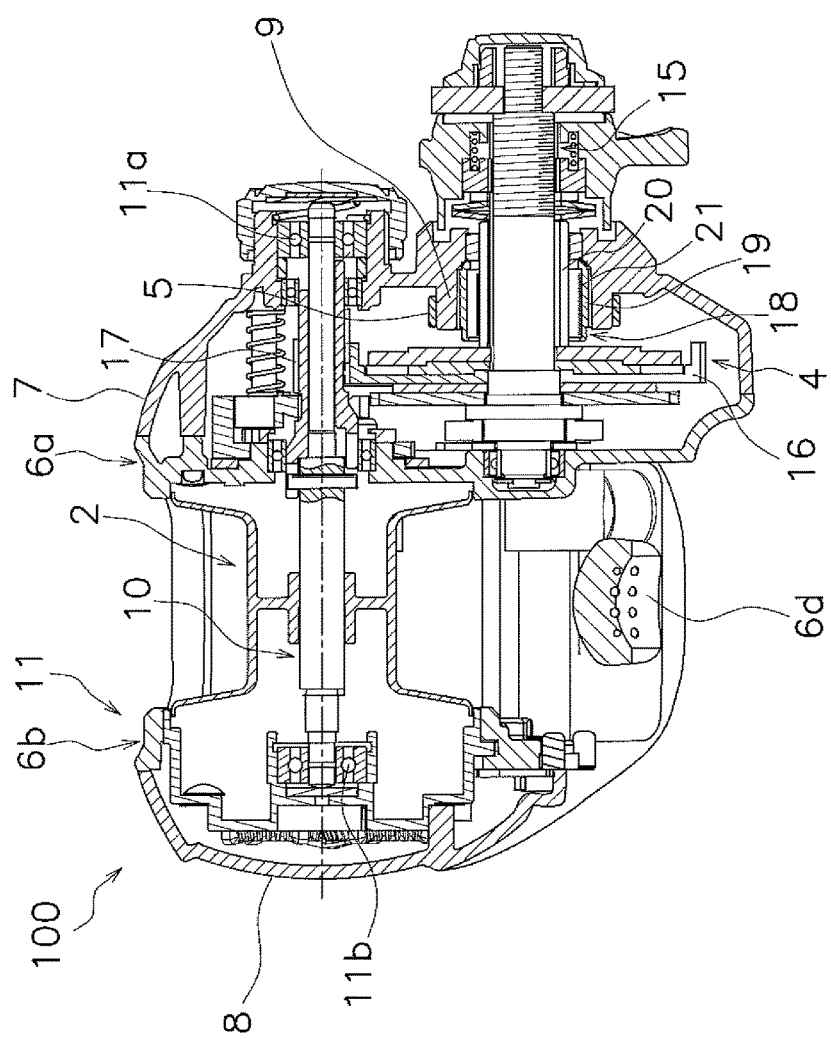
FIG. 2 is a cross-sectional view of the dual-bearing reel according to one embodiment of the present invention.

The dual-bearing reel to which one embodiment of the present invention has been employed is, for example, a bait-casting reel. As shown in FIG. 1 and FIG. 2, the dual-bearing reel 100 comprises a reel body 1, a spool 2, a handle 3, a rotation transmission mechanism 4, and a prevention member 5.

The reel body 1 is made from a synthetic resin and comprises a frame 6, and a first side cover 7 and a second side cover 8 that are mounted so as to cover both sides of the frame 6.

The frame 6 comprises a first side plate 6a, a second side plate 6b that is disposed at a predetermined distance from the first side plate 6a, a plurality of connecting portions, which are not shown, which connect the first side plate 6a and the second side plate 6b, and a rod mounting portion 6d for the mounting of a fishing rod.

The first side cover 7 has a boss portion 9 that extends through the first side cover 7 in the axial direction. The boss portion 9 can have a tubular shape.

The spool 2 is rotatably disposed between the first side plate 6a and the second side plate 6b. Fishing line can be wound around the outer perimeter surface of the spool 2. The spool 2 is fixed to a spool shaft 10, which extends through the center of the spool 2, and is integrally rotated with the spool shaft 10. The spool shaft 10 is rotatably supported in the reel body 1 by axle bearings 11a, 11b, disposed in the reel body 1.

The handle 3 is rotatably mounted on a side portion of the first side cover 7 of the reel body 1. The spool 2 is rotated by the rotation transmission mechanism 4 by rotating the handle 3.

The rotation transmission mechanism 4 is disposed inside the first side cover 7. The rotation transmission mechanism 4 comprises a drive shaft 15 (one example of a shaft member), a drive gear 16, and a tubular pinion gear 17. The drive shaft 15 is non-rotatably connected to the handle 3. The drive gear 16 is attached to the drive shaft 15. The pinion gear 17 is mounted around the spool shaft 10 and meshes with the drive shaft 15.

The rotation of the drive shaft 15 is transmitted to the pinion gear 17 by the drive gear 16, and the spool 2 is rotated together with the spool shaft 10 by the rotation of the pinion gear 17, which is attached to the spool shaft 10. A small, lightweight, roller-type, one-way clutch (hereinafter referred to as roller clutch) 18 is mounted on the drive shaft 15.

Figure 3:
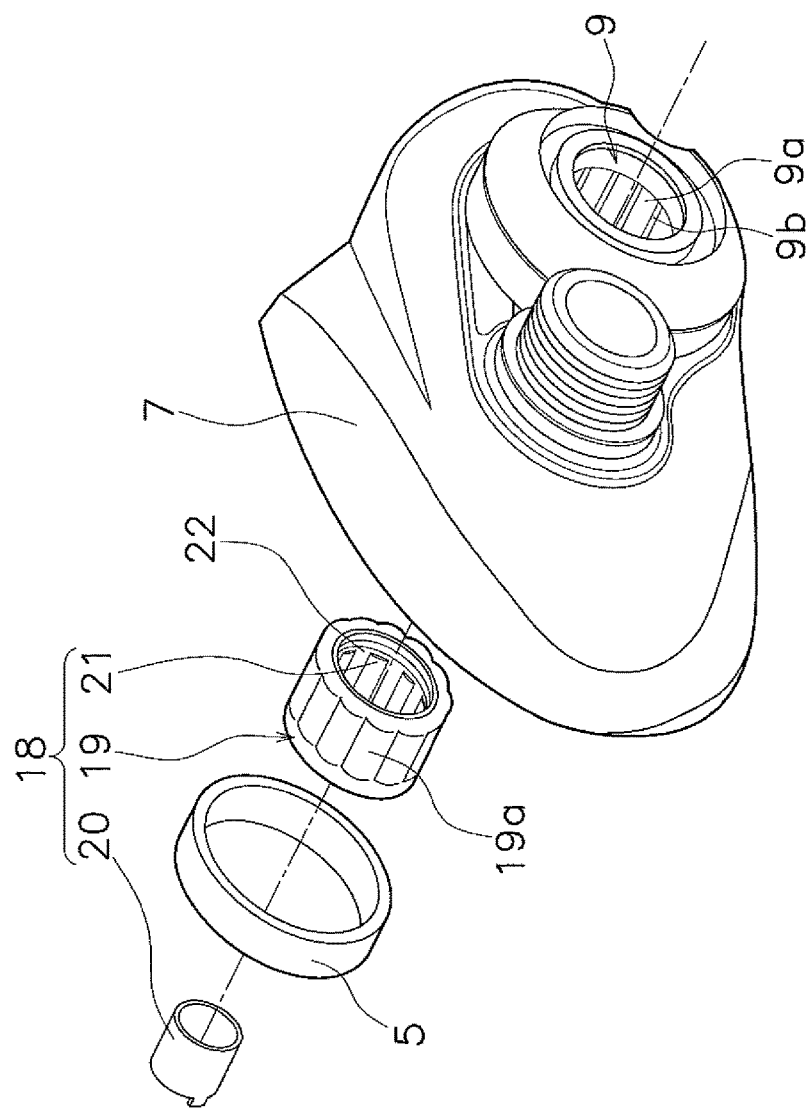
FIG. 3 is an exploded perspective view of the periphery of the boss portion, including the prevention member.
Figure 4:
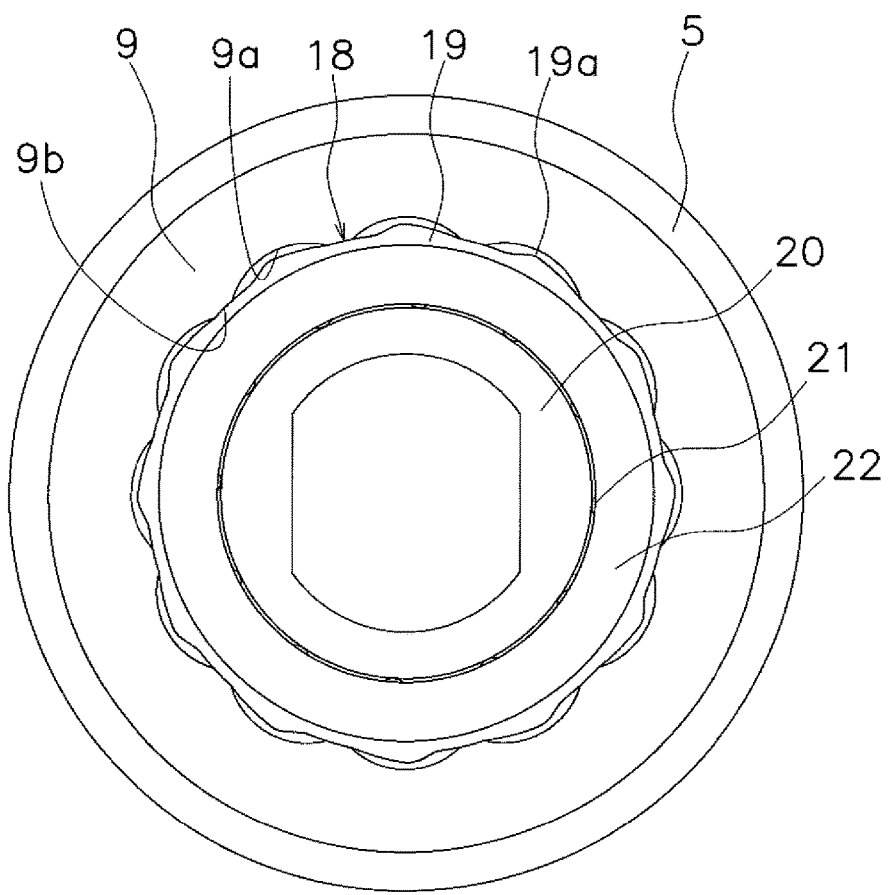
FIG. 4 is a side view when the roller clutch is attached to the boss portion as seen from the side of the second side cover.

The roller clutch 18 prevents the rotation of the drive shaft 15 in one direction and allows rotation in the other direction. As shown in FIG. 2, the roller clutch 18 is disposed on the inner perimeter of the boss portion 9 of the first side cover 7. As shown in FIG. 3 and FIG. 4, the boss portion 9 comprises a plurality of recessed portions 9a and a plurality of abutting portions 9b on the inner perimeter surface thereof. The plurality of recessed portions 9a and the plurality of abutting portions 9b are alternately disposed on the inner perimeter surface of the boss portion 9 along the circumferential direction. FIG. 4 also shows a view when the roller clutch 18 is attached to the boss portion 9 as seen from the side of the second side cover 8.

The plurality of recessed portions 9a are formed at a predetermined interval from each other in the circumferential direction. Each of the plurality of recessed portions 9a is formed recessed radially outwardly in the form of a circular arc relative to the inner perimeter surface of the boss portion 9, and is formed extending along the axial direction on the inner perimeter surface of the boss portion 9.

The plurality of abutting portions 9b are formed at a predetermined interval from each other in the circumferential direction, and are formed extending along the axial direction on the inner perimeter surface of the boss portion 9. The inner diameter of the abutting portions 9b is smaller than the inner diameter of the recessed portions 9a.

The roller clutch 18 comprises an outer race 19, an inner race 20 that is connected to the drive shaft 15 so as to be integrally rotatable, and a rolling element 21.

The outer race 19 has protruding portions 19a formed such that the outer diameter of the outer perimeter thereof changes along the circumferential direction. The protruding portions 19a are formed at predetermined intervals from each other in the circumferential direction, and are formed extending along the axial direction on the outer perimeter surface of the outer race 19. The inner perimeter surface of the outer race 19 has the same shape as the outer perimeter surface of the outer race 19, and a cam surface, which is not shown, is formed on the inner perimeter surface.

The outer race 19 is non-rotatably press-fitted to the inner perimeter portion of the boss portion 9. Specifically, portions of the outer perimeter surface of the outer race 19, in which the protruding portions 19a are not formed, abut against and are fixed to the abutting portions 9b of the boss portion 9. As shown in FIG. 4, the protruding portions 19a of the outer race 19 are disposed so as to enter the recessed portions 9a of the boss portion 9 from the radial direction, and a predetermined gap is disposed between the protruding portions 19a and the recessed portions 9a.

A plurality of rolling elements 21 are disposed at intervals in the circumferential direction. The rolling elements 21 are rollably held by a rolling element cage 22 disposed between the outer race 19 and the inner race 20. The outer perimeter surface of the inner race 20 abuts the rolling elements 21.

Since the movement of the roller clutch 18 is the same as conventionally known movements, a detailed explanation thereof is omitted. Here, when the drive shaft 15 is rotated in the fishing line winding direction (counterclockwise in FIG. 4), the rolling elements 21 are idle in the positions of the protruding portions 19a of the outer race 19, and rotation of the drive shaft 15 is allowed. On the other hand, when the drive shaft 15 is rotated in the direction opposite to the fishing line winding direction (clockwise in FIG. 4), the rolling elements 21 move and bite into the space between the cam surface of the outer race 19 and the outer perimeter surface of the inner race 20, to prevent the rotation of the drive shaft 15.

The prevention member 5 prevents a radially outward expansion of the boss portion 9. The prevention member 5 is an annular member (refer to FIG. 3) made from a metal or resin. The prevention member 5 is attached to the outer perimeter of the boss portion 9 by a fixing method, device or means such as press-fitting, bonding, and screwing. As shown in FIG. 2 and FIG. 4, the prevention member 5 is disposed on the radially outer side of the roller clutch 18.

Here, the roller clutch 18 employed in the present embodiment is small, lightweight, and has an outer race 19 of low rigidity. Thus, when rotation of the handle 3 in one direction (here, clockwise in FIG. 4) is prevented, slippage between the outer race 19 and the rolling elements 21 is suppressed by utilizing the rigidity of the boss portion 9 of the reel body 1, to which the outer race 19 is non-rotatably attached.

Specifically, when the rolling elements 21 bite into the space between the cam surface of the outer race 19 and the outer perimeter surface of the inner race 20, the outer race 19 tends to expand radially outwardly. This radially outward expansion of the outer race 19 is suppressed by the abutting portions 9b of the boss portion 9. In other words, here, when rotation of the handle 3 in one direction is prevented, the roller clutch 18 is disposed in the boss portion 9 such that the abutting portions 9b of the boss portion 9 substantially function as an outer race.

Therefore, for example, when the reel body 1 is molded from a material with low rigidity, such as a resin, there are cases in which a radially outward expansion of the outer race 19 cannot be prevented by the boss portion 9 of the reel body 1. That is, when the outer race 19 expands radially outwardly, the boss portion 9 thus also expands radially outwardly. Consequently, when the rolling elements 21 bite into the space between the cam surface of the outer race 19 and the outer perimeter surface of the inner race 20, there is the risk of slippage between the outer race 19 and the rolling elements 21, so that that the drive shaft 15 will not be prevented from rotating and from idly rotating relative to the reel body 1.

In such a case, by providing a prevention member 5 on the outer perimeter of the boss portion 9, it is possible to prevent a radially outward expansion of the boss portion 9, and thereby to prevent a radially outward expansion of the roller clutch 18 as well. Hence, it is possible to suppress slippage between the outer race 19 and the rolling elements 21 when the rolling elements 21 bite into the space between the cam surface of the outer race 19 and the outer perimeter surface of the inner race 20, and reliably prevent rotation of the handle 3 in one direction.

Thus, by providing a prevention member 5 in the reel body 1, a roller clutch 18 having an outer race 19 with low rigidity can be widely adopted in variously shaped dual-bearing reels, regardless of size or the like of the reel body 1, even when the rigidity of the reel body 1 is low.

OTHER EMBODIMENTS

Although each embodiment of the present invention has been presented heretofore, the present invention is not limited to these embodiments, and various modifications can be made without departing from the scope of the invention.

(a) In the above-described embodiment, a drive shaft 15 was illustrated as one example of a shaft member; however, the present invention may be applied with, for example, a spool shaft as the shaft member.

(b) In the above-described embodiment, an annular prevention member 5 is attached to the outer perimeter of the boss portion 9, but the shape of the prevention member 5 is not limited thereto. The shape may be of any form that is capable of preventing a radially outward expansion of the boss portion 9, and the shape may be appropriately changed according to the shape of the boss portion, as well as according to various configurations of the roller clutch (combinations of the outer race, the inner race, the rolling element, and the like). For example, a prevention member 5 may be partially or fragmentarily provided on the outer perimeter of the boss portion.

What is claimed is:

1. A dual-bearing reel, comprising
a reel body having a boss portion;
a shaft member extending through the boss portion and rotatably supported in the reel body;
a roller clutch including an outer race non-rotatably mounted in the boss portion, an inner race connected to the shaft member so as to be integrally rotatable, and a rolling element disposed between the outer race and the inner race, the roller clutch preventing rotation of the shaft member in one direction, the outer race including a plurality of protruding portions; and
a prevention member mounted on an outer perimeter of the boss portion within lateral confines of the roller clutch to prevent radially outward expansion of the boss portion and the roller clutch.

2. The dual-bearing reel recited in claim 1, wherein the prevention member is disposed on a radially outer side of the roller clutch.

3. The dual-bearing reel recited in claim 1, wherein the prevention member is annular.

4. The dual-bearing reel recited in claim 1, wherein the prevention member is one of metal or resin.

5. The dual-bearing reel recited in claim 1, wherein the prevention member is nonrotatably mounted to the boss portion by at least one of press-fitting, bonding, or screwing.

* * * * *